United States Patent
Bai et al.

(10) Patent No.: US 12,317,256 B2
(45) Date of Patent: May 27, 2025

(54) DATA COMMUNICATION METHOD AND APPARATUS

(71) Applicant: DATANG MOBILE COMMUNICATIONS EQUIPMENT CO., LTD., Beijing (CN)

(72) Inventors: Wei Bai, Beijing (CN); Xuejuan Gao, Beijing (CN); Lei Zhou, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 429 days.

(21) Appl. No.: 17/917,996

(22) PCT Filed: Mar. 26, 2021

(86) PCT No.: PCT/CN2021/083364
§ 371 (c)(1),
(2) Date: Oct. 10, 2022

(87) PCT Pub. No.: WO2021/203993
PCT Pub. Date: Oct. 14, 2021

(65) Prior Publication Data
US 2023/0156696 A1 May 18, 2023

(30) Foreign Application Priority Data
Apr. 10, 2020 (CN) .......................... 202010278691.7

(51) Int. Cl.
*H04W 72/1268* (2023.01)
*H04W 72/23* (2023.01)

(52) U.S. Cl.
CPC ....... *H04W 72/1268* (2013.01); *H04W 72/23* (2023.01)

(58) Field of Classification Search
None
See application file for complete search history.

(56) References Cited

U.S. PATENT DOCUMENTS

2020/0304242 A1 9/2020 Jiang et al.
2021/0321413 A1* 10/2021 Shin ...................... H04W 72/23
2021/0337428 A1* 10/2021 Li ...................... H04W 72/0446

FOREIGN PATENT DOCUMENTS

| CN | 108401482 A | 8/2018 |
| CN | 110035514 A | 7/2019 |
| WO | 2020029245 A1 | 8/2018 |

OTHER PUBLICATIONS

ZTE et al. "RI-1801503 Remaining issues for UL data transmission procedure" 3GPP. Mar. 2, 2018 (Mar. 2, 2018).

(Continued)

*Primary Examiner* — Walter J Divito
(74) *Attorney, Agent, or Firm* — Meunier Carlin & Curfman LLC (57) ABSTRACT

Disclosed are a data transmission method and apparatus, which are used for realizing low-delay and high-reliability transmission of data in a new radio (NR) system. The method comprises: determining an actual transmission opportunity in a transmission period according to a notification of a network side, and determining a first transmission opportunity on the basis of the actual transmission opportunity, wherein there are T valid transmission opportunities between the first transmission opportunity and a first moment, the valid transmission opportunities include an actual transmission opportunity with an RV of zero, and the first moment is before the end of the transmission period or before the start of a period of a second configuration authorization configuration; when data is ready before the first transmission opportunity and after the second transmission opportunity, starting data transmission at the first transmission opportunity, wherein the second transmission opportunity is the actual transmission opportunity before the first transmission opportunity; and when the data is ready after the first transmission opportunity, starting the data (Continued)

transmission in the next period. Therefore, a valid starting position may be determined according to a received signaling indication.

19 Claims, 3 Drawing Sheets

(56) References Cited

OTHER PUBLICATIONS

3GPP TR 38.824 V1.2.0, "3rd Generation Partnership Project; Technical Specification Group Radio Access Network; Study on physical layer enhancements for NR ultra-reliable and low latency case (URLLC)", Release 16 (Mar. 2019).
HiSilicon Huawei, "Reliability enhancement for grant-free transmission," 3GPP TSG RAN WG1 Meeting #92, R1-1801787, Athens, Greece (Feb. 26-Mar. 2, 2018).
Panasonic, "On PUSCH enhancements for NR URLLC", 3GPP TSG RAN WG1 #98bis, R1-1910521, Chongqing, China (Oct. 14-Oct. 20, 2019).

* cited by examiner

FIG. 1

```
┌─────────────────────────────────────────────┐
│ Determining a valid transmission occasion in a transmission
│ period according to a notification from a network side, and
│ determining a first transmission occasion based on the valid
│     transmission occasion; where there are only T valid
│     transmission occasions between the first transmission
│     occasion and a first moment, where T>=1, the valid
│     transmission occasion includes an actual transmission
│ occasion with RV of 0, and the first moment is before an
│ ending of the transmission period or before a beginning of a
│  period of a second configured grant configuration that is
│ different from a configured grant configuration to which the
│             first transmission occasion belongs
└─────────────────────────────────────────────┘   ⌇ S201
                         │
                         ▼
┌─────────────────────────────────────────────┐
│  When data is ready before the first transmission occasion   │   ⌇ S202
│    and after a second transmission occasion that is a valid  │
│ transmission occasion before the first transmission occasion,│
│     starting data communication in the first transmission    │
│   occasion; when data is ready after the first transmission  │
│    occasion, starting data communication in a next period    │
└─────────────────────────────────────────────┘
```

FIG. 2

Determining a valid transmission occasion in a transmission period, and determining a first transmission occasion based on the valid transmission occasion; where there are only T valid transmission occasions between the first transmission occasion and a first moment, where T>=1, the valid transmission occasion includes an actual transmission occasion with RV of 0, and the first moment is before an ending of the transmission period or before a beginning of a period of a second configured grant configuration that is different from a configured grant configuration to which the first transmission occasion belongs  ⌒ S301

↓

Detecting whether data arrives in the first transmission occasion and a transmission occasion before the first transmission occasion, or starting sending data in the first transmission occasion  ⌒ S302

DATA COMMUNICATION METHOD AND APPARATUS

CROSS-REFERENCE OF RELATED APPLICATIONS

The application is a US National Stage of International Application No. PCT/CN2021/083364, filed on Mar. 26, 2021, which claims the priority from Chinese Patent Application No. 202010278691.7, filed with the China National Intellectual Property Administration on Apr. 10, 2020 and entitled "Data communication method and Apparatus", which is hereby incorporated by reference in its entirety.

TECHNICAL FIELD

The application relates to the field of communication technologies, and particularly to a data communication method and apparatus.

BACKGROUND

In the New Radio (NR) Ultra-Reliable and Low Latency Communications (URLLC) scheme, the next-generation base station (gNB) firstly configures the transmission of Physical Uplink Shared Channel (PUSCH) by signaling, including a period P of resource allocation, the number K of repetitions, a Redundancy Version (RV) sequence, positions of K resources in the period P and other information, where the positions of K resources become K Transmission Occasions (TOs).

The following table shows the corresponding starting transmission positions for different RV configurations when different numbers K of repetitions are configured in the URLLC UL configured grant transmission scheme.

|       | RV = {0 0 0 0} | RV = {0 3 0 3} | RV = {0 2 3 1} |
|---|---|---|---|
| K = 1 | {0} | {0} | {0} |
| K = 2 | {0 0} if start from $1^{st}$ TO<br>{0} if start from $2^{nd}$ TO | {0 3} always start from $1^{st}$ TO | {0 2} always start from $1^{st}$ TO |
| K = 4 | {0 0 0 0} if start from $1^{st}$ TO<br>{0 0 0} if start from $2^{nd}$ TO<br>{0 0} if start from $3^{rd}$ TO<br>{0} if start from $4^{th}$ TO | {0 3 0 3} if start from $1^{st}$ TO<br>{0 3} if start from $3^{rd}$ TO | {0 2 3 1} always start from $1^{st}$ TO |
| K = 8 | {0 0 0 0 0 0 0 0} if start from $1^{st}$ TO<br>{0 0 0 0 0 0 0} if start from $2^{nd}$ TO<br>{0 0 0 0 0 0} if start from $3^{rd}$ TO<br>{0 0 0 0 0} if start from $4^{th}$ TO<br>{0 0 0 0} if start from $5^{th}$ TO<br>{0 0 0} if |start from $6^{th}$ TO<br>{0 0} if start from $7^{th}$ TO | {0 3 0 3 0 3 0 3} if start from $1^{st}$ TO<br>{0 3 0 3 0 3} if start from $3^{rd}$ TO<br>{0 3 0 3} if start from $5^{th}$ TO<br>{0 3} if start from $7^{th}$ TO | {0 2 3 1 0 2 3 1} always start from $1^{st}$ TO |

Here, for example, when K=2 and RV={0 0 0 0}, the corresponding "{0 0} if start from $1^{st}$ TO" means that the base station is configured with 2 transmission occasions. When the data arrives before the first transmission occasion, the terminal will use two transmission occasions for twice transmissions, and the RVs of the twice transmissions are 0 and 0.

When K=2 and RV={0 3 0 3}, the corresponding "{0 3} always start from $1^{st}$ TO" means that the base station is configured with 2 transmission occasions. When the data arrives before the first transmission occasion, the terminal will use two transmission occasions for twice transmissions, and the RVs of the twice transmissions are 0 and 3.

When K=8 and RV={0 2 3 1}, the corresponding "{0 2 3 1 0 2 3 1} always start from $1^{st}$ TO" means that the base station is configured with 8 transmission occasions. When the data arrives before the first transmission occasion, the terminal will use 8 transmission occasions for 8 transmissions, and the RVs of the 8 transmissions are 0, 2, 3, 1, 0, 2, 3 and 1.

However, in the existing UL configured grant transmission, the method of determining the starting position is only determined according to "K" without considering the effects of Radio Resource Control (RRC) signaling and Downlink Control Information (DCI) signaling. When the base station informs a User Equipment (UE) that the last n TOs cannot be used for PUSCH transmission through RRC signaling or DCI signaling, there will be only one transmission when the penultimate n+1 TO is used as the starting position to start transmission according to the scheme in the prior art, thus greatly affecting the detection and decoding performance of the PUSCH.

SUMMARY

Embodiments of the application provide a data communication method and apparatus, so as to realize the low-latency and high-reliability transmission of data in the NR system.

On the terminal side, a data communication method according to embodiments of the application includes:
  determining a valid transmission occasion in a transmission period according to a notification from a network side, and determining a first transmission occasion based on the valid transmission occasion; where there are only T valid transmission occasions between the first transmission occasion and a first moment, where T>=1, the valid transmission occasion includes an actual transmission occasion with RV of 0, and the first moment is before an ending of the transmission period or before a beginning of a period of a second configured grant configuration that is different from a configured grant configuration to which the first transmission occasion belongs;
  when data is ready before the first transmission occasion and after a second transmission occasion that is a valid transmission occasion before the first transmission occasion, starting data communication in the first transmission occasion; when the data is ready after the first transmission occasion, starting data communication in a next period.

In embodiments of the application, through this method, a valid transmission occasion is determined in a transmission period according to a notification from the network side, and a first transmission occasion is determined based on the valid transmission occasion. There are only T valid transmission occasions between the first transmission occasion and a first moment, where T>=1, the valid transmission occasion includes an actual transmission occasion with RV of 0, and the first moment is before an ending of the transmission period or before a beginning of a period of a second configured grant configuration that is different from a configured grant configuration to which the first transmission occasion belongs. When the data is ready before the first transmission occasion and after a second transmission occasion that is a valid transmission occasion before the first transmission occasion, the data starts being sent in the first transmission occasion; when the data is ready after the first transmission occasion, the data starts being sent in a next period, thereby realizing the low-latency and high-reliability transmission of data in the NR system.

Optionally, the transmission period includes K nominal transmission occasions, where K>=1;
the determining a valid transmission occasion in a transmission period according to a notification from a network side and determining a first transmission occasion based on the valid transmission occasion, specifically includes:
determining a valid transmission occasion among the K nominal transmission occasions according to the notification from the network side;
determining the valid transmission occasion within time from an $S^{th}$ nominal transmission occasion to a $(K-2)^{th}$ nominal transmission occasion as the first transmission occasion, where S>=1, the valid transmission occasion is an actual transmission occasion with RV=0, or the valid transmission occasion is a nominal transmission occasion including an actual transmission occasion with RV=0.

Optionally, the notification from the network side includes RRC signaling or DCI signaling.

Optionally, the DCI signaling includes dynamic scheduling signaling or SFI signaling.

Correspondingly, on the network side, a data communication method according to embodiments of the application includes:
determining a valid transmission occasion in a transmission period, and determining a first transmission occasion based on the valid transmission occasion; where there are only T valid transmission occasions between the first transmission occasion and a first moment, where T>=1, the valid transmission occasion includes an actual transmission occasion with RV of 0, and the first moment is before an ending of the transmission period or before a beginning of a period of a second configured grant configuration that is different from a configured grant configuration to which the first transmission occasion belongs;
detecting whether data arrives in the first transmission occasion and a transmission occasion before the first transmission occasion, or starting sending data in the first transmission occasion.

Optionally, the transmission period includes K nominal transmission occasions, wherein K>=1;
the determining a valid transmission occasion in a transmission period and determining a first transmission occasion based on the valid transmission occasion, specifically includes:
determining a valid transmission occasion among the K nominal transmission occasions;
determining the valid transmission occasion within time from an $S^{th}$ nominal transmission occasion to a $(K-2)^{th}$ nominal transmission occasion as the first transmission occasion, where S>=1, the valid transmission occasion is an actual transmission occasion with RV=0, or the valid transmission occasion is a nominal transmission occasion including an actual transmission occasion with RV=0.

Optionally, the method further includes:
sending a notification for instructing a terminal to determine the first transmission occasion in the transmission period to the terminal.

Optionally, the notification includes RRC signaling or DCI signaling.

Optionally, the DCI signaling includes dynamic scheduling signaling or SFI signaling.

On the terminal side, a data communication apparatus according to embodiments of the application includes:
a memory configured to store program instructions;
a processor configured to invoke the program instructions stored in the memory and execute according to an obtained program:
determining a valid transmission occasion in a transmission period according to a notification from a network side, and determining a first transmission occasion based on the valid transmission occasion; wherein there are only T valid transmission occasions between the first transmission occasion and a first moment, wherein T>=1, the valid transmission occasion includes an actual transmission occasion with RV of 0, and the first moment is before an ending of the transmission period or before a beginning of a period of a second configured grant configuration that is different from a configured grant configuration to which the first transmission occasion belongs;
when the data is ready before the first transmission occasion and after a second transmission occasion that is a valid transmission occasion before the first transmission occasion, starting data communication in the first transmission occasion; when the data is ready after the first transmission occasion, starting data communication in a next period.

Optionally, the transmission period includes K nominal transmission occasions, where K>=1;
the processor is specifically configured to:
determine a valid transmission occasion among the K nominal transmission occasions according to the notification from the network side;
determine the valid transmission occasion within time from an $S^{th}$ nominal transmission occasion to a $(K-2)^{th}$ nominal transmission occasion as the first transmission occasion, where S>=1, the valid transmission occasion is an actual transmission occasion with RV=0, or the valid transmission occasion is a nominal transmission occasion including an actual transmission occasion with RV=0.

Optionally, the notification from the network side includes RRC signaling or DCI signaling.

Optionally, the DCI signaling includes dynamic scheduling signaling or SFI signaling.

Correspondingly, on the network side, a data communication apparatus according to embodiments of the application includes:
a memory configured to store program instructions;

a processor configured to invoke the program instructions stored in the memory and execute according to an obtained program:
  determining a valid transmission occasion in a transmission period, and determining a first transmission occasion based on the valid transmission occasion; where there are only T valid transmission occasions between the first transmission occasion and a first moment, where T>=1, the valid transmission occasion includes an actual transmission occasion with RV of 0, and the first moment is before an ending of the transmission period or before a beginning of a period of a second configured grant configuration that is different from a configured grant configuration to which the first transmission occasion belongs;
  detecting whether data arrives in the first transmission occasion and a transmission occasion before the first transmission occasion, or starting sending data in the first transmission occasion.

Optionally, the transmission period includes K nominal transmission occasions, wherein K>=1;
  the processor is specifically configured to:
  determine a valid transmission occasion among the K nominal transmission occasions;
  determine the valid transmission occasion within time from an $S^{th}$ nominal transmission occasion to a $(K-2)^{th}$ nominal transmission occasion as the first transmission occasion, where S>=1, the valid transmission occasion is an actual transmission occasion with RV=0, or the valid transmission occasion is a nominal transmission occasion including an actual transmission occasion with RV=0.

Optionally, the processor is further configured to:
  send a notification for instructing a terminal to determine the first transmission occasion in the transmission period to the terminal.

Optionally, the notification includes RRC signaling or DCI signaling.

Optionally, the DCI signaling includes dynamic scheduling signaling or SFI signaling.

On the terminal side, another data communication apparatus according to embodiments of the application includes:
  a first transmission occasion determining unit, configured to determine a valid transmission occasion in a transmission period according to a notification from a network side, and determine a first transmission occasion based on the valid transmission occasion; wherein there are only T valid transmission occasions between the first transmission occasion and a first moment, where T>=1, the valid transmission occasion includes an actual transmission occasion with RV of 0, and the first moment is before an ending of the transmission period or before a beginning of a period of a second configured grant configuration that is different from a configured grant configuration to which the first transmission occasion belongs;
  a transmission unit, configured to, when the data is ready before the first transmission occasion and after a second transmission occasion that is a valid transmission occasion before the first transmission occasion, start data communication in the first transmission occasion; when the data is ready after the first transmission occasion, start data communication in a next period.

On the network side, another data communication apparatus according to embodiments of the application includes:
  a first unit, configured to determine a valid transmission occasion in a transmission period, and determine a first transmission occasion based on the valid transmission occasion; wherein there are only T valid transmission occasions between the first transmission occasion and a first moment, where T>=1, the valid transmission occasion includes an actual transmission occasion with RV of 0, and the first moment is before an ending of the transmission period or before a beginning of a period of a second configured grant configuration that is different from a configured grant configuration to which the first transmission occasion belongs;
  a second unit, configured to detect whether data arrives in the first transmission occasion and a transmission occasion before the first transmission occasion, or start sending data in the first transmission occasion.

Another embodiment of the application provides a computing device, which includes a memory and a processor, wherein the memory is configured to store the program instructions, and the processor is configured to invoke the program instructions stored in the memory and perform any one of the above-mentioned methods in accordance with the obtained program.

Another embodiment of the application provides a computer storage medium storing the computer executable instructions which are configured to cause the computer to perform any one of the above-mentioned methods.

BRIEF DESCRIPTION OF THE DRAWINGS

In order to illustrate the technical solutions in embodiments of the application more clearly, the accompanying figures which need to be used in describing the embodiments will be introduced below briefly. Obviously the accompanying figures described below are only some embodiments of the application, and other accompanying figures can also be obtained by those ordinary skilled in the art according to these accompanying figures without creative labor.

DETAILED DESCRIPTION

The technical solutions in embodiments of the application will be described clearly and completely below in combination with the accompanying drawings in embodiments of the application. Obviously, the described embodiments are only a part of embodiments of the application but not all the embodiments. Based upon embodiments of the application, all of other embodiments obtained by those ordinary skilled in the art without creative work pertain to the protection scope of the application.

Embodiments of the application provide a data communication method and apparatus, so as to realize the low-latency and high-reliability transmission of data in the NR system.

Here, the method and device are based on the same application concept. Since the principle of solving the problem in the method is similar to that in the device, the implementations of the device and method can refer to each other, and the repeated description thereof will be omitted.

The technical solutions provided by embodiments of the application may be applicable to various systems, especially 5G systems. For example, the applicable systems may be: Global System of Mobile communication (GSM) system, Code Division Multiple Access (CDMA) system, Wideband Code Division Multiple Access (WCDMA) system, General Packet Radio Service (GPRS) system, Long Term Evolution (LTE) system, LTE Frequency Division Duplex (FDD) system, LTE Time Division Duplex (TDD) system, Universal Mobile Telecommunication System (UMTS), Worldwide interoperability for Microwave Access (WiMAX) system, 5G system and 5G NR system, etc. These systems all include terminal devices and network devices.

The terminal device involved in embodiments of the application may be a device for providing the voice and/or data connectivity to the user, a handheld device with the wireless connection function, or other processing device connected to the wireless modem. In different systems, the terminal device may have different names. For example, in a 5G system, the terminal device may be referred to as User Equipment (UE). The wireless terminal device can communicate with one or more core networks via the Radio Access Network (RAN), and the wireless terminal device can be a mobile terminal, such as a mobile telephone (or called "cellular" telephone), and a computer with the mobile terminal, for example, can be a portable, pocket, handheld, computer built-in or vehicle-carried mobile device, and they exchange the voice and/or data with the radio access network. For example, Personal Communication Service (PCS) telephone, cordless telephone, Session Initiation Protocol (SIP) telephone, Wireless Local Loop (WLL) station, Personal Digital Assistant (PDA) and other devices. The wireless terminal device can also be called system, subscriber unit, subscriber station, mobile station, mobile, remote station, access point, remote terminal, access terminal, user terminal, user agent, user device, which is not limited in embodiments of the application.

The network device involved in embodiments of the application may be a base station, which may include a plurality of cells. Depending on specific application scenarios, the base station may also be called access point, or may refer to the device in the access network communicating with the wireless terminal via one or more sectors over the air interface or other names The network device may be used to perform the inter-conversion between the received air frame and Internet Protocol (IP) packet, and used as the router between the wireless terminal device and the rest of the access network, wherein the rest of the access network may include IP networks. The network device may further coordinate the attribute management of the air interface. For example, the network device involved in embodiments of the application can be a network device (Base Transceiver Station (BTS)) in the Global System of Mobile communication (GSM) or Code Division Multiple Access (CDMA), or can be a network device (NodeB) in the Wideband Code Division Multiple Access (WCDMA), or can be an evolutional network device (evolutional Node B (eNB or e-NodeB)) in the Long Term Evolution (LTE) system, a 5G base station in the 5G network architecture (next generation system), or can be a Home evolved Node B (HeNB), a relay node, femto, pico, etc., which is not limited in embodiments of the application.

Embodiments of the application will be described below in detail with reference to the drawings of the specification. It should be noted that the showing order of embodiments of the application only represents the sequential order of the embodiments, but does not represent the pros and cons of the technical solutions provided by the embodiments.

The technical solution provided by embodiments of the application provides a scheme for determining a transmission start position of UL configured grant in the NR system, and specifically provides a scheme on how to determine a valid transmission start position under signaling indication.

With the development and change of mobile communication service requirements, many organizations such as 3rd Generation Partnership Project (3GPP) have begun to study new wireless communication systems (i.e., 5 Generation New Radio (5G NR)) for future mobile communication systems. In the 5G NR system, an important requirement is low-latency and high-reliable communication, and transmission schemes such as URLLC have emerged. The simple low-latency requirement or simple high-reliability requirement is relatively easy to implement, but it is difficult to meet the low-latency requirement and high-reliability requirement at the same time, which is usually implemented at the expense of high complexity.

For the URLLC service, in the NR standard, the uplink configured grant scheme (called CG scheme for short) will be supported to reduce the transmission delay of air interface, and at the same time, the repeated transmission scheme will be supported to increase the reliability.

UL configured grant transmission: the dynamic scheduling requires the Physical Downlink Control Channel (PDCCH) to dynamically indicate the transmission mode, and the overhead of the control channel exists; there is such a type of service that the size of the data packet is relatively fixed and the time interval between data packets also satisfies the certain regularity. For this reason, the NR supports the UL configured grant transmission. In the UL configured grant transmission, the resources of the system only need to be activated once through the PDCCH, and then the same time-frequency resources can be periodically reused. After the transmission is completed, the resources of the system only need to be released through the PDCCH.

The arrival of the user data on the UE side is random, but the configuration period is defined in the current uplink scheduling-free repeated transmission scheme; meanwhile, it is required that the UE starts transmission within a period and then must end transmission within the period, and the cross-period transmission is not allowed, so that the actual number of repeated transmissions is less than the configured number of repeated transmissions, thus affecting the reliability. On the premise of ensuring that the data is sent as soon as possible after the data arrives, in order to improve the reliability, it is necessary to avoid the situation of only one transmission.

When there is RRC signaling or DCI signaling indicating which resources are available or unavailable for target transmission within a period of time, it is necessary to further determine a valid starting position according to the signaling, to start the repeated transmission of the UL configured grant in the NR system.

The detailed introduction of the technical solution provided by embodiments of the application will be given below.

A Transport Block (TB) can be sent from any TO with RV=0, except for the last T (T>=1) TOs with RV=0. TO refers to a valid TO, and the so-called valid TO means that no symbol in this TO is redirected by RRC signaling or DCI signaling.

The scheme of processing in accordance with the nominal transmission occasion is as follows.

A first transmission occasion is determined within the time from the $S^{th}$ nominal transmission occasion to the $(K-2)^{th}$ nominal transmission occasion (including the $S^{th}$ and $(K-2)^{th}$ nominal transmission occasions) among K nominal transmission occasions in a configuration period, where S>=1. The characteristic of the first transmission occasion is: there are only T valid transmission occasions between the first transmission occasion and a first moment, where T>=1, and the valid transmission occasion includes an actual transmission occasion with RV of 0. For example, there are only T (T>=1) valid transmission occasions between the first transmission occasion and the end of the current transmission period, and the valid transmission occasion is an actual transmission occasion with RV=0, or a nominal transmission occasion including the actual transmission occasion of RV=0. The first moment is before the ending of the transmission period or before the beginning of a period of a second configured grant configuration that is different from a configured grant configuration to which the first transmission occasion belongs, and the valid transmission occasion includes an actual transmission occasion with RV of 0. The configured grant configuration is periodical resource allocation. There are K transmission occasions in a period, which are repeated periodically; for a configured grant configuration, the resource allocation is performed in periods, and this period is the period of the configured grant configuration. There may be multiple such configured grant configurations, and the period boundaries between them are temporally misaligned with each other, that is, the period boundaries are not aligned. When the data is ready before the start position of the first transmission occasion and after the start position of the second transmission occasion, the data starts being sent in the first transmission occasion; when the data is ready after the start position of the first transmission occasion, the data starts being sent in a next period, where the second transmission occasion is an actual transmission occasion before the first transmission occasion.

The method for determining the first transmission occasion is: the base station notifies the UE through RRC signaling or DCI signaling, and the DCI signaling included dynamic scheduling signaling and Slot Format Indication (SFI) signaling. From the $(K+1)^{th}$ nominal transmission occasion to the $K^{th}$ nominal transmission occasion, there are only T actual transmission occasions where the uplink (or downlink) data transmission with RV=0 can be performed, or, there are only T nominal transmission occasions including a transmission occasion where the uplink (or downlink) data transmission with RV=0 can be performed, so the $k^{th}$ nominal transmission occasion is the first transmission occasion. Here, T may be a value defined in protocol, or a value indicated in RRC signaling or DCI signaling; T may be the same for all possible k values, or may be a value determined by the value of k, where k is greater than or equal to 1 and less than or equal to K.

The above method being applied to the actual transmission occasion is described as follows.

A first transmission occasion is determined within the time from the $S^{th}$ actual transmission occasion to the $N-2^{th}$ actual transmission occasion among K nominal transmission occasions in a configuration period, where S>=1, and N is the actual number of repeated transmissions within a period, here there are only T valid transmission occasions between the first transmission occasion and a first moment, where T>=1, the valid transmission occasion includes an actual transmission occasion with RV of 0, and the first moment is before the ending of the transmission period or before the beginning of a period of a second configured grant configuration that is different from a configured grant configuration to which the first transmission occasion belongs. When the data is ready before the start position of the first transmission occasion and after the start position of the second transmission occasion, the data starts being sent in the first transmission occasion; when the data is ready after the start position of the first transmission occasion, the data starts being sent in a next period, where the second transmission occasion is an actual transmission occasion before the first transmission occasion.

The method for determining the first transmission occasion is: the base station notifies the UE through RRC signaling or DCI signaling, and the DCI signaling includes dynamic scheduling signaling or SFI signaling. From the $(K+1)^{th}$ actual transmission occasion to the last configured actual transmission occasion, there are only T actual transmission occasions where the uplink (or downlink) data transmission with RV=0 can be performed, so the $k^{th}$ actual transmission occasion is the first transmission occasion, where k is greater than or equal to 1 and less than or equal to K.

In embodiments of the application, the nominal transmission occasion refers to the transmission occasion configured by the base station, and may not be used for transmission due to resource conflict or may be divided into small transmission occasions for multiple transmissions, when the terminal actually performs transmission. The actual transmission occasion is a resource position occupied by the terminal for actual transmission.

Behavior on the base station side:
sending RRC signaling or DCI signaling to indicate which resources are available or unavailable to the target transmission for a period of time;
determining a first transmission occasion according to the method for determining the first transmission occasion;
detecting whether data arrives in the first transmission occasion and a transmission occasion before the first transmission occasion, or starting sending data in the first transmission occasion.

Behavior on the UE side:
receiving RRC signaling or DCI signaling, and finding out an available transmission occasion, i.e., an actual transmission occasion, from the $S^{th}$ nominal transmission occasion to the $(K-2)^{th}$ nominal transmission occasion;
determining a first transmission occasion according to the method for determining the first transmission occasion;
starting data communication in the first transmission occasion when the data is ready before the first transmission occasion and after a second transmission occasion; starting data communication in a next period when the data is ready after the first transmission occasion.

First Embodiment

Figure 1:
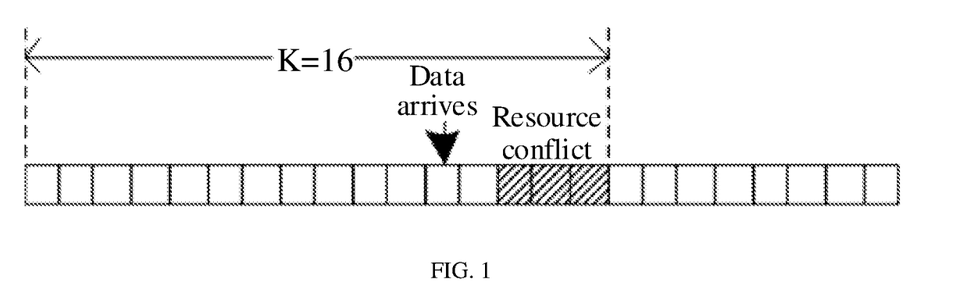
FIG. 1 is a schematic diagram illustrating resource conflict in a data transmission period according to some embodiments of the application.

Referring to FIG. 1, the base station notifies the UE that the number of repeated transmissions is K=16 through RRC signaling and/or DCI signaling, and the base station notifies the UE that the $14^{th}$, $15^{th}$, and $16^{th}$ nominal transmission occasions are unavailable (that is, resource conflict shown in the figure) through RRC signaling or DCI signaling. At this time, the UE starts to search for the first transmission occasion from the first nominal transmission occasion to the $K-2=14^{th}$ nominal transmission occasion, and finds that there is only one nominal transmission occasion (that is, the $13^{th}$ nominal transmission occasion) on which the data transmission with RV=0 can be performed from the $12^{th}$ nominal transmission occasion to the end of the period, where the 13th nominal transmission occasion is a valid transmission occasion. Thus, it can be seen that the $12^{th}$ nominal transmission occasion is the first transmission occasion. When the data arrives after the starting point of the $11^{th}$ nominal transmission occasion and before the starting point of the $12^{th}$ nominal transmission occasion, the data transmission will start in the $12^{th}$ nominal transmission occasion; when the data arrives after the starting point of the $12^{th}$ nominal transmission occasion, the data transmission will start in a next period.

To sum up, in the technical solution provided by embodiments of the application, the first transmission occasion is determined within the time from the $S^{th}$ nominal transmission occasion to the $(K-2)^{th}$ nominal transmission occasion among K nominal transmission occasions in a configuration period, where S>=1. The characteristic of the first transmission occasion is: there are only T (T>=1) valid transmission occasions between the first transmission occasion and the end of the period. The valid transmission occasion is an actual transmission occasion with RV=0, or a nominal transmission occasion including the actual transmission occasion of RV=0. When the data is ready before the start position of the first transmission occasion and after the start position of the second transmission occasion, the data starts being sent in the first transmission occasion; when the data is ready after the start position of the first transmission occasion, the data starts being sent in a next period, where the second transmission occasion is an actual transmission occasion before the first transmission occasion.

Here, the method for determining the first transmission occasion is: the base station notifies the UE through RRC signaling or DCI signaling, and the DCI signaling includes dynamic scheduling signaling or SFI signaling. From the $(K+1)^{th}$ nominal transmission occasion to the $K^{th}$ nominal transmission occasion, there are only T actual transmission occasions where the uplink (or downlink) data transmission with RV=0 can be performed, or, there are only T nominal transmission occasions including a transmission occasion where the uplink (or downlink) data transmission with RV=0 can be performed, so the $k^{th}$ nominal transmission occasion is the first transmission occasion, where k is greater than or equal to 1 and less than or equal to K.

Therefore, embodiments of the application provide a solution for determining the start transmission position, in which the valid start position can be determined according to the received signaling indication, so as to realize the low-latency and high-reliability transmission in the NR system.

Figure 2:
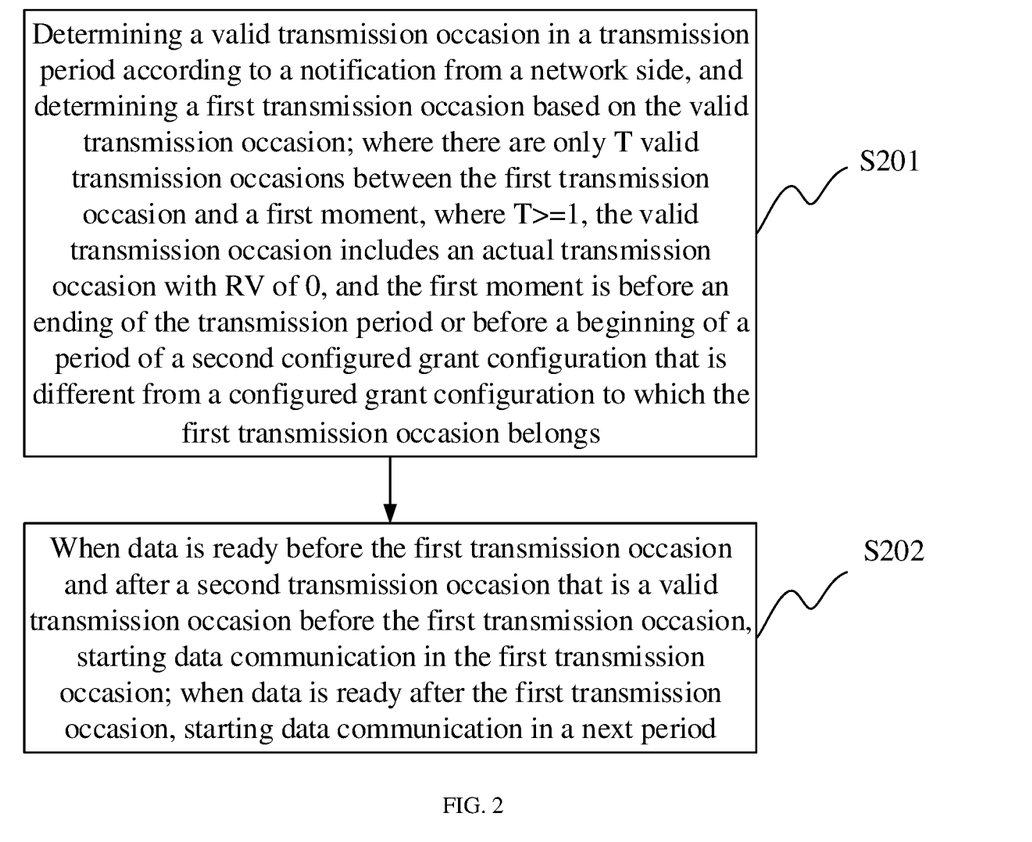
FIG. 2 is a schematic flowchart of a data communication method at the terminal side according to some embodiments of the application.

To sum up, referring to FIG. 2, on the terminal side, a data communication method according to embodiments of the application includes the following.

S201: determining a valid transmission occasion in a transmission period according to a notification from a network side, and determining a first transmission occasion based on the valid transmission occasion; where there are only T valid transmission occasions between the first transmission occasion and a first moment, where T>=1, the valid transmission occasion includes an actual transmission occasion with RV of 0, and the first moment is before an ending of the transmission period or before a beginning of a period of a second configured grant configuration that is different from a configured grant configuration to which the first transmission occasion belongs.

Here, the valid transmission occasion includes an actual transmission occasion with RV of 0, for example, the valid transmission occasion is an actual transmission occasion with RV=0, or a nominal transmission occasion including an actual transmission occasion with RV=0.

S202: starting data communication in the first transmission occasion when the data is ready before the first transmission occasion and after a second transmission occasion that is a valid transmission occasion before the first transmission occasion; starting data communication in a next period when the data is ready after the first transmission occasion.

In the embodiment of the application, through this method, a valid transmission occasion is determined in a transmission period according to a notification from the network side, and a first transmission occasion is determined based on the valid transmission occasion. Here there are only T valid transmission occasions between the first transmission occasion and a first moment, where T>=1, the valid transmission occasion includes an actual transmission occasion with RV of 0, and the first moment is before an ending of the transmission period or before a beginning of a period of a second configured grant configuration that is different from a configured grant configuration to which the first transmission occasion belongs. When the data is ready before the first transmission occasion and after a second transmission occasion that is a valid transmission occasion before the first transmission occasion, the data starts being sent in the first transmission occasion; when the data is ready after the first transmission occasion, the data starts being sent in a next period, thereby realizing the low-latency and high-reliability transmission of data in the NR system.

Optionally, the transmission period includes K nominal transmission occasions, where K>=1;
  the determining a valid transmission occasion in a transmission period according to a notification from a network side and determining a first transmission occasion based on the valid transmission occasion, specifically includes:
  determining a valid transmission occasion among the K nominal transmission occasions according to the notification from the network side;
  determining the valid transmission occasion within time from an $S^{th}$ nominal transmission occasion to a $(K-2)^{th}$ nominal transmission occasion as the first transmission occasion, where S>=1, the valid transmission occasion is an actual transmission occasion with RV=0, or the valid transmission occasion is a nominal transmission occasion including an actual transmission occasion with RV=0.

Optionally, the notification from the network side includes RRC signaling or DCI signaling.

Optionally, the DCI signaling includes dynamic scheduling signaling or SFI signaling.

Figure 3:
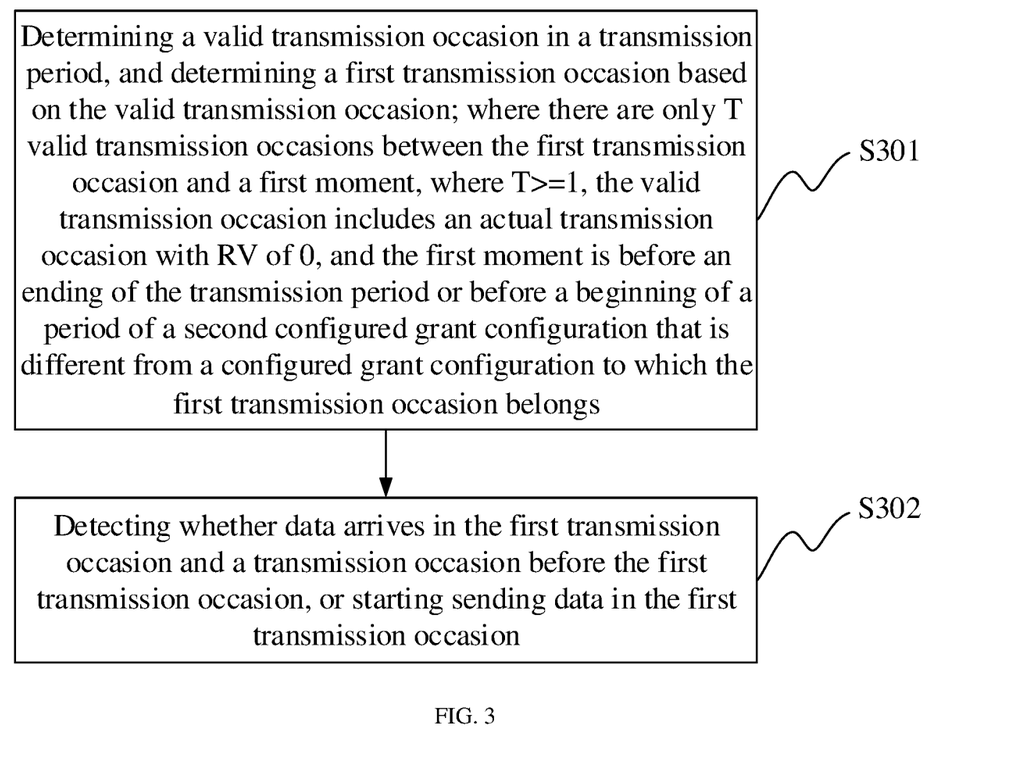
FIG. 3 is a schematic flowchart of a data communication method at the network side according to some embodiments of the application.

Correspondingly, referring to FIG. 3, on the network side, a data communication method according to embodiments of the application includes the following.

S301: determining a valid transmission occasion in a transmission period, and determining a first transmission occasion based on the valid transmission occasion; where there are only T valid transmission occasions between the first transmission occasion and a first moment, where T>=1, the valid transmission occasion includes an actual transmission occasion with RV of 0, and the first moment is before an ending of the transmission period or before a beginning of a period of a second configured grant configuration that is different from a configured grant configuration to which the first transmission occasion belongs.

S302: detecting whether data arrives in the first transmission occasion and a transmission occasion before the first transmission occasion, or starting sending data in the first transmission occasion.

Optionally, the transmission period includes K nominal transmission occasions, where K>=1;

the determining a valid transmission occasion in a transmission period and determining a first transmission occasion based on the valid transmission occasion, specifically includes:

determining a valid transmission occasion among the K nominal transmission occasions;

determining the valid transmission occasion within time from an $S^{th}$ nominal transmission occasion to a $(K-2)^{th}$ nominal transmission occasion as the first transmission occasion, where S>=1, the valid transmission occasion is an actual transmission occasion with RV=0, or the valid transmission occasion is a nominal transmission occasion including an actual transmission occasion with RV=0.

Optionally, the method further includes:

sending a notification for instructing a terminal to determine the first transmission occasion in the transmission period to the terminal.

Optionally, the notification includes RRC signaling or DCI signaling.

Optionally, the DCI signaling includes dynamic scheduling signaling or SFI signaling.

Figure 4:
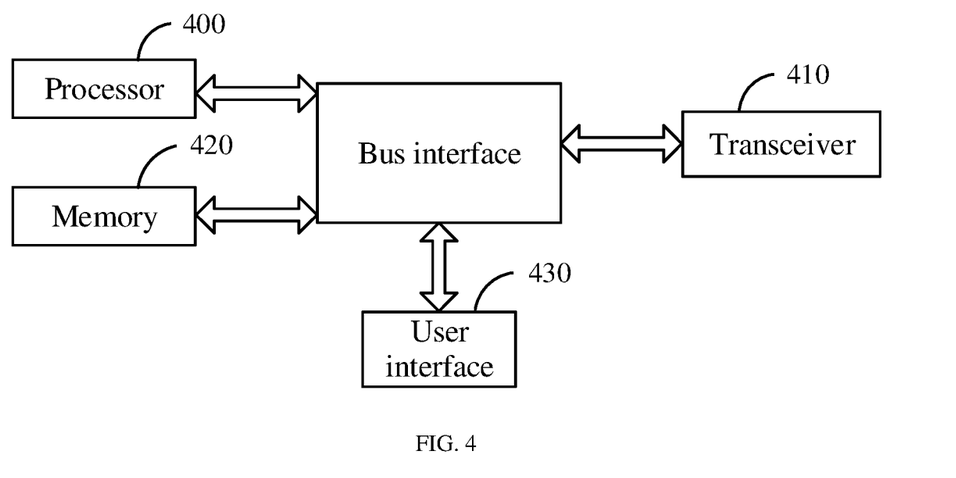
FIG. 4 is a structural schematic diagram of a data communication apparatus at the terminal side according to some embodiments of the application.

Referring to FIG. 4, at the terminal side, a data communication apparatus according to embodiments of the application includes:

a memory 420 configured to store program instructions;

a processor 400 configured to invoke the program instructions stored in the memory, and execute according to an obtained program:

determining a valid transmission occasion in a transmission period according to a notification from a network side, and determining a first transmission occasion based on the valid transmission occasion; where there are only T valid transmission occasions in a period of time after the first transmission occasion and before a first moment, where T>=1, the valid transmission occasion includes an actual transmission occasion with RV of 0, and the first moment is before an ending of the transmission period or before a beginning of a period of a second configured grant configuration that is different from a configured grant configuration to which the first transmission occasion belongs;

starting data communication in the first transmission occasion when the data is ready before the first transmission occasion and after a second transmission occasion that is a valid transmission occasion before the first transmission occasion; and starting data communication in a next period when the data is ready after the first transmission occasion.

Optionally, the transmission period includes K nominal transmission occasions, where K>=1;

the processor 400 is specifically configured to:

determine a valid transmission occasion among the K nominal transmission occasions according to the notification from the network side;

determine the valid transmission occasion within time from an $S^{th}$ nominal transmission occasion to a $(K-2)^{th}$ nominal transmission occasion as the first transmission occasion, where S>=1, the valid transmission occasion is an actual transmission occasion with RV=0, or the valid transmission occasion is a nominal transmission occasion including an actual transmission occasion with RV=0.

Optionally, the notification from the network side includes RRC signaling or DCI signaling.

Optionally, the DCI signaling includes dynamic scheduling signaling or SFI signaling.

A transceiver 410 is configured to receive and send the data under the control of the processor 400.

Here, in FIG. 4, the bus architecture may include any numbers of interconnected buses and bridges, and specifically link various circuits of one or more processors represented by the processor 400 and the memory represented by the memory 420. The bus architecture may further link various other circuits such as peripheral device, voltage regulator and power management circuit, which are all well known in the art and thus will not be further described again herein. The bus interface provides an interface. The transceiver 410 may be a plurality of elements, i.e., include a transmitter and a receiver, and provide the units for communicating with various other devices over the transmission media. For different user equipment, the user interface 430 may also be the interface capable of inter-connecting or exter-connecting with the required devices, and the connected devices include but not limited to keypad, display, loudspeaker, microphone, joystick, etc.

The processor 400 is responsible for managing the bus architecture and general processing, and the memory 420 may store the data used by the processor 400 when performing the operations.

Optionally, the processor 400 may be CPU (Central Processing Unit), ASIC (Application Specific Integrated Circuit), FPGA (Field-Programmable Gate Array) or CPLD (Complex Programmable Logic Device).

Figure 5:
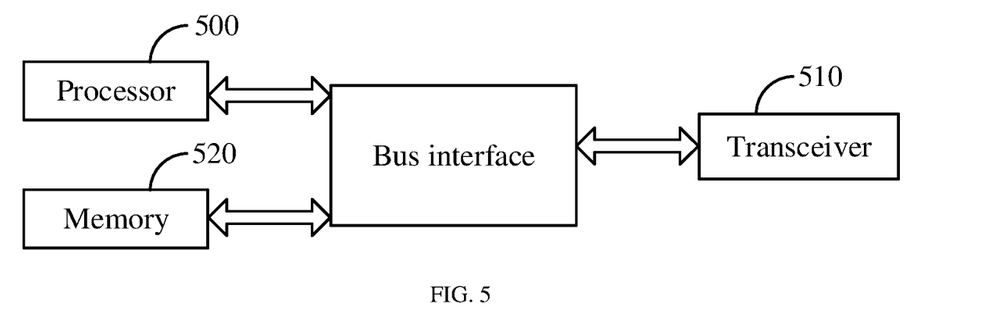
FIG. 5 is a structural schematic diagram of a data communication apparatus at the network side according to some embodiments of the application.

Correspondingly, referring to FIG. 5, at the network side, a data communication apparatus according to embodiments of the application includes:

a memory 520 configured to store program instructions;

a processor 500 configured to invoke the program instructions stored in the memory, and execute according to an obtained program:

determining a valid transmission occasion in a transmission period, and determining a first transmission occasion based on the valid transmission occasion; where there are only T valid transmission occasions between the first transmission occasion and a first moment, where T>=1, the valid transmission occasion includes an actual transmission occasion with RV of 0, and the first moment is before an ending of the transmission period or before a beginning of a period of a second configured grant configuration that is different from a configured grant configuration to which the first transmission occasion belongs;

detecting whether data arrives in the first transmission occasion and a transmission occasion before the first transmission occasion, or starting sending data in the first transmission occasion.

Optionally, the transmission period includes K nominal transmission occasions, wherein K>=1;

the processor 500 is specifically configured to:
determine a valid transmission occasion among the K nominal transmission occasions;
determine the valid transmission occasion within time from an $S^{th}$ nominal transmission occasion to a $(K-2)^{th}$ nominal transmission occasion as the first transmission occasion, where S>=1, the valid transmission occasion is an actual transmission occasion with RV=0, or the valid transmission occasion is a nominal transmission occasion including an actual transmission occasion with RV=0.

Optionally, the processor 500 is further configured to:
send a notification for instructing a terminal to determine the first transmission occasion in the transmission period to the terminal.

Optionally, the notification includes RRC signaling or DCI signaling.

Optionally, the DCI signaling includes dynamic scheduling signaling or SFI signaling.

A transceiver 510 is configured to receive and send the data under the control of the processor 500.

Here, in FIG. 5, the bus architecture can include any numbers of interconnected buses and bridges, and specifically link various circuits of one or more processors represented by the processor 500 and the memory represented by the memory 520. The bus architecture may further link various other circuits such as peripheral device, voltage regulator and power management circuit, which are all well known in the art and thus will not be further described again herein. The bus interface provides an interface. The transceiver 510 may be a plurality of elements, i.e., include a transmitter and a receiver, and provide the units for communicating with various other devices over the transmission media. The processor 500 is responsible for managing the bus architecture and general processing, and the memory 520 may store the data used by the processor 500 when performing the operations.

The processor 500 may be Central Processing Unit (CPU), Application Specific Integrated Circuit (ASIC), Field-Programmable Gate Array (FPGA) or Complex Programmable Logic Device (CPLD).

Figure 6:
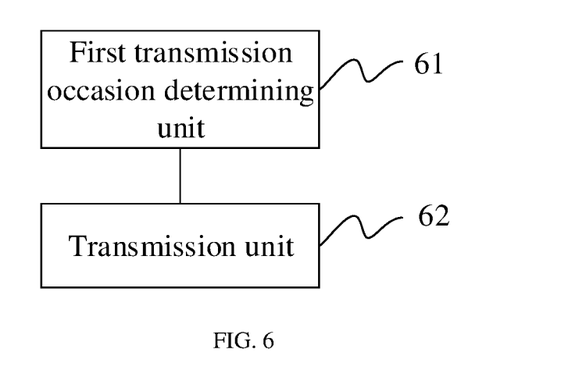
FIG. 6 is a structural schematic diagram of another data communication apparatus at the terminal side according to some embodiments of the application.

Referring to FIG. 6, at the terminal side, another data communication apparatus according to embodiments of the application includes:
a first transmission occasion determining unit 61, configured to determine a valid transmission occasion in a transmission period according to a notification from a network side, and determine a first transmission occasion based on the valid transmission occasion; where there are only T valid transmission occasions between the first transmission occasion and a first moment, where T>=1, the valid transmission occasion includes an actual transmission occasion with RV of 0, and the first moment is before an ending of the transmission period or before a beginning of a period of a second configured grant configuration that is different from a configured grant configuration to which the first transmission occasion belongs;
a transmission unit 62, configured to start data communication in the first transmission occasion when the data is ready before the first transmission occasion and after a second transmission occasion that is a valid transmission occasion before the first transmission occasion; and start data communication in a next period when the data is ready after the first transmission occasion.

Optionally, the transmission period includes K nominal transmission occasions, wherein K>=1;

the first transmission occasion determining unit 61 is specifically configured to:
determine a valid transmission occasion among the K nominal transmission occasions according to the notification from the network side;
determine the valid transmission occasion within time from an $S^{th}$ nominal transmission occasion to a $(K-2)^{th}$ nominal transmission occasion as the first transmission occasion, wherein S>=1, the valid transmission occasion is an actual transmission occasion with RV=0, or the valid transmission occasion is a nominal transmission occasion including an actual transmission occasion with RV=0.

Optionally, the notification from the network side includes RRC signaling or DCI signaling.

Optionally, the DCI signaling includes dynamic scheduling signaling or SFI signaling.

Figure 7:
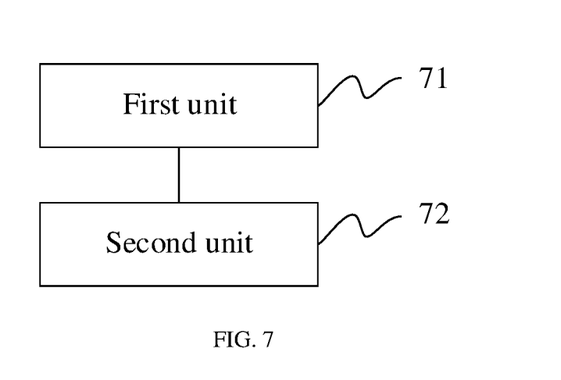
FIG. 7 is a structural schematic diagram of another data communication apparatus at the network side according to some embodiments of the application.

Referring to FIG. 7, on the network side, another data communication apparatus according to embodiments of the application includes:
a first unit 71, configured to determine a valid transmission occasion in a transmission period, and determine a first transmission occasion based on the valid transmission occasion; wherein there are only T valid transmission occasions between the first transmission occasion and a first moment, where T>=1, the valid transmission occasion includes an actual transmission occasion with RV of 0, and the first moment is before an ending of the transmission period or before a beginning of a period of a second configured grant configuration that is different from a configured grant configuration to which the first transmission occasion belongs;
a second unit 72, configured to detect whether data arrives in the first transmission occasion and a transmission occasion before the first transmission occasion, or start sending data in the first transmission occasion.

Optionally, the transmission period includes K nominal transmission occasions, wherein K>=1;
the first unit 71 is specifically configured to:
determine a valid transmission occasion among the K nominal transmission occasions;
determine the valid transmission occasion within time from an $S^{th}$ nominal transmission occasion to a $(K-2)^{th}$ nominal transmission occasion as the first transmission occasion, where S>=1, the valid transmission occasion is an actual transmission occasion with RV=0, or the valid transmission occasion is a nominal transmission occasion including an actual transmission occasion with RV=0.

Optionally, the first unit 71 is further configured to:
send a notification for instructing a terminal to determine the first transmission occasion in the transmission period to the terminal.

Optionally, the notification includes RRC signaling or DCI signaling.

Optionally, the DCI signaling includes dynamic scheduling signaling or SFI signaling.

It should be noted that the division of units in embodiments of the application is illustrative, and is merely a kind of logical function division, and there may be other division methods in actual implementations. In addition, the functional units in each embodiment of the application may be integrated into one processing unit, or each unit may exist alone physically, or two or more units may be integrated into one unit. The above-mentioned integrated units can be implemented in the form of hardware, or can be implemented in the form of software functional units.

When the integrated unit is implemented in the form of software functional unit and sold or used as an independent product, it may be stored in a computer readable storage medium. Based on such understanding, the technical solution of the application essentially or a part that contributes to the prior art or all or a part of the technical solution may be embodied in the form of software product. The computer software product is stored in a storage medium, and includes several instructions used to enable a computer device (which may be a personal computer, server, or network device, etc.) or a processor to perform all or some of the steps of the methods of various embodiments of the application. The above-mentioned storage medium includes: USB flash drive, mobile hard disk, Read-Only Memory (ROM), Random Access Memory (RAM), magnetic disk or compact disc or various media that can store the program codes.

Embodiment of the application provide a computing device, which can specifically be a desktop computer, a portable computer, a smart phone, a tablet computer, a Personal Digital Assistant (PDA) or the like. The computing device can include a Center Processing Unit (CPU), a memory, input/output devices and the like. The input device can include a keyboard, a mouse, a touch screen and the like, and the output device can include a display device such as Liquid Crystal Display (LCD), Cathode Ray Tube (CRT) or the like.

The memory can include a Read-Only Memory (ROM) and a Random Access Memory (RAM), and provide the program instructions and data stored in the memory to the processor. In embodiments of the application, the memory may be used to store the program of any one of the methods provided by embodiments of the application.

The processor invokes the program instructions stored in the memory and is configured to perform any one of the methods provided by embodiments of the application in accordance with the obtained program instructions.

Embodiments of the application provide a computer storage medium for storing the computer program instructions used by the apparatuses provided by embodiments of the application described above, where the computer storage medium contains the program for performing any one of the methods provided by embodiments of the application described above.

The computer storage medium may be any available media or data storage device accessible to the computer, including but not limited to magnetic memory (e.g., floppy disk, hard disk, magnetic tape, Magnetic Optical disc (MO) or the like), optical memory (e.g., CD, DVD, BD, HVD or the like), semiconductor memory (e.g., ROM, EPROM, EEPROM, nonvolatile memory (NAND FLASH), Solid State Disk (SSD)) or the like.

The methods provided by embodiments of the application may be applied to the terminal devices, and may also be applied to the network devices.

Here, the terminal device can also referred to as the User Equipment ("UE" for short), Mobile Station ("MS" for short), Mobile Terminal ("MT" for short) or the like. Optionally, the terminal can has the ability of communicating with one or more core networks via the Radio Access Network (RAN). For example, the terminal can be a mobile telephone (or called "cellular" telephone), or a computer with the mobile property. For example, the terminal can also be a portable, pocket, handheld, computer built-in or vehicle-carried mobile device.

The network device may be a base station (e.g., access point), which means the device in the access network communicating with the wireless terminal via one or more sectors over the air interface. The base station may be used to perform the inter-conversion between the received air frame and the IP packet, and used as the router between the wireless terminal and the rest of the access network, wherein the rest of the access network may include Internet Protocol (IP) networks. The base station may further coordinate the attribute management of the air interface. For example, the base station can be the BTS in the GSM or CDMA, or can be the NodeB in the WCDMA, or can be the NodeB or eNB or e-NodeB (evolutional Node B) in the LTE, or can be the gNB in the 5G system, or the like, which is not limited in embodiments of the application.

The processing flows of the above methods may be implemented by a software program, which may be stored in a storage medium. When the stored software program is invoked, the above method steps are performed.

It should be understood by those skilled in the art that embodiments of the application can provide methods, systems and computer program products. Thus the application can take the form of hardware embodiments alone, software embodiments alone, or embodiments combining the software and hardware aspects. Also the application can take the form of computer program products implemented on one or more computer usable storage mediums (including but not limited to magnetic disk memories, optical memories and the like) including computer usable program codes therein.

The application is described by reference to the flow charts and/or the block diagrams of the methods, the devices (systems) and the computer program products according to embodiments of the application. It should be understood that each process and/or block in the flow charts and/or the block diagrams, and a combination of processes and/or blocks in the flow charts and/or the block diagrams can be implemented by the computer program instructions. These computer program instructions can be provided to a general-purpose computer, a dedicated computer, an embedded processor, or a processor of another programmable data processing device to produce a machine, so that an apparatus for implementing the functions specified in one or more processes of the flow charts and/or one or more blocks of the block diagrams is produced by the instructions executed by the computer or the processor of another programmable data processing device.

These computer program instructions can also be stored in a computer readable memory which is capable of guiding the computer or another programmable data processing device to operate in a particular way, so that the instructions stored in the computer readable memory produce a manufacture including the instruction apparatus which implements the functions specified in one or more processes of the flow charts and/or one or more blocks of the block diagrams.

These computer program instructions can also be loaded onto the computer or another programmable data processing device, so that a series of operation steps are performed on the computer or another programmable device to produce the computer-implemented processing. Thus the instructions executed on the computer or another programmable device provide steps for implementing the functions specified in one or more processes of the flow charts and/or one or more blocks of the block diagrams.

Evidently those skilled in the art can make various modifications and variations to the application without departing from the spirit and scope of the application. Thus the application is also intended to encompass these modifications and variations therein as long as these modifications and variations to the application come into the scope of the claims of the application and their equivalents.

What is claimed is:

1. A data communication method, comprising:
   determining a valid transmission occasion in a transmission period according to a notification from a network side, and determining a first transmission occasion based on the valid transmission occasion;
   wherein there are only T valid transmission occasions between the first transmission occasion and a first moment, wherein T>=1, the valid transmission occasion comprises an actual transmission occasion with Redundancy Version, RV, of 0, and the first moment is before an ending of the transmission period or before a beginning of a period of a second configured grant configuration, wherein the second configured grant configuration is different from a first configured grant configuration to which the first transmission occasion belongs;
   when data is ready before the first transmission occasion and after a second transmission occasion which is a valid transmission occasion before the first transmission occasion, starting data communication in the first transmission occasion;
   when data is ready after the first transmission occasion, starting data communication in a next period.

2. The method according to claim 1, wherein the transmission period comprises K nominal transmission occasions, wherein K>=1;
   the determining a valid transmission occasion in a transmission period according to a notification from a network side and determining a first transmission occasion based on the valid transmission occasion, specifically comprises:
   determining a valid transmission occasion among the K nominal transmission occasions according to the notification from the network side;
   determining the valid transmission occasion within time from an $S^{th}$ nominal transmission occasion to a $(K-2)^{th}$ nominal transmission occasion as the first transmission occasion, wherein S>=1, the valid transmission occasion is an actual transmission occasion with RV=0, or the valid transmission occasion is a nominal transmission occasion including an actual transmission occasion with RV=0.

3. The method according to claim 2, wherein the notification from the network side comprises Radio Resource Control, RRC, signaling or Downlink Control Information, DCI, signaling.

4. The method according to claim 3, wherein the DCI signaling comprises dynamic scheduling signaling or Slot Format Indication, SFI, signaling.

5. A data communication method, comprising:
   determining a valid transmission occasion in a transmission period, and determining a first transmission occasion based on the valid transmission occasion; wherein there are only T valid transmission occasions between the first transmission occasion and a first moment, wherein T>=1, the valid transmission occasion comprises an actual transmission occasion with Redundancy Version, RV, of 0, and the first moment is before an ending of the transmission period or before a beginning of a period of a second configured grant configuration, wherein the second configured grant configuration is different from a first configured grant configuration to which the first transmission occasion belongs;
   detecting whether data arrives in the first transmission occasion and a transmission occasion before the first transmission, or starting sending data in the first transmission occasion.

6. The method according to claim 5, wherein the transmission period comprises K nominal transmission occasions, wherein K>=1;
   the determining a valid transmission occasion in a transmission period and determining a first transmission occasion based on the valid transmission occasion, comprises:
   determining a valid transmission occasion among the K nominal transmission occasions;
   determining the valid transmission occasion within time from an $S^{th}$ nominal transmission occasion to a $(K-2)^{th}$ nominal transmission occasion as the first transmission occasion, wherein S>=1, the valid transmission occasion is an actual transmission occasion with RV=0, or the valid transmission occasion is a nominal transmission occasion comprising an actual transmission occasion with RV=0.

7. The method according to claim 5, further comprising:
   sending a notification for instructing a terminal to determine the first transmission occasion in the transmission period to the terminal.

8. The method according to claim 7, wherein the notification comprises Radio Resource Control, RRC, signaling or Downlink Control Information, DCI, signaling.

9. The method according to claim 8, wherein the DCI signaling comprises dynamic scheduling signaling or Slot Format Indication, SFI, signaling.

10. A data communication apparatus, comprising:
    a memory configured to store program instructions;
    a processor configured to invoke the program instructions stored in the memory and execute according to an obtained program:
    determining a valid transmission occasion in a transmission period according to a notification from a network side, and determining a first transmission occasion based on the valid transmission occasion; wherein there are only T valid transmission occasions between the first transmission occasion and a first moment, wherein T>=1, the valid transmission occasion comprises an actual transmission occasion with Redundancy Version, RV, of 0, and the first moment is before an ending of the transmission period or before a beginning of a period of a second configured grant configuration, wherein the second configured grant configuration is different from a first configured grant configuration to which the first transmission occasion belongs;
    when data is ready before the first transmission occasion and after a second transmission occasion that is a valid transmission occasion before the first transmission occasion, starting data communication in the first transmission occasion;
    when data is ready after the first transmission occasion, starting data communication in a next period.

11. The apparatus according to claim 10, wherein the transmission period comprises K nominal transmission occasions, wherein K>=1;
    the processor is configured to:
    determine a valid transmission occasion among the K nominal transmission occasions according to the notification from the network side;
    determine the valid transmission occasion within time from an $S^{th}$ nominal transmission occasion to a $(K-2)^{th}$ nominal transmission occasion as the first transmission occasion, wherein S>=1, the valid transmission occasion is an actual transmission occasion with RV=0, or the valid transmission occasion is a nominal transmission occasion comprising an actual transmission occasion with RV=0.

12. The apparatus according to claim 11, wherein the notification from the network side comprises Radio Resource Control, RRC, signaling or Downlink Control Information, DCI, signaling.

13. The apparatus according to claim 12, wherein the DCI signaling comprises dynamic scheduling signaling or Slot Format Indication, SFI, signaling.

14. A data communication apparatus, comprising:
a memory configured to store program instructions;
a processor configured to invoke the program instructions stored in the memory and execute the method according to claim 5.

15. The apparatus according to claim 14, wherein the transmission period comprises K nominal transmission occasions, wherein K>=1;
the processor is specifically configured to:
determine a valid transmission occasion among the K nominal transmission occasions;
determine the valid transmission occasion within time from an $S^{th}$ nominal transmission occasion to a $(K-2)^{th}$ nominal transmission occasion as the first transmission occasion, wherein S>=1, the valid transmission occasion is an actual transmission occasion with RV=0, or the valid transmission occasion is a nominal transmission occasion comprising an actual transmission occasion with RV=0.

16. The apparatus according to claim 14, wherein the processor is further configured to:
send a notification for instructing a terminal to determine the first transmission occasion in the transmission period to the terminal.

17. The apparatus according to claim 16, wherein the notification comprises Radio Resource Control, RRC, signaling or Downlink Control Information, DCI, signaling.

18. The apparatus according to claim 17, wherein the DCI signaling comprises dynamic scheduling signaling or Slot Format Indication, SFI, signaling.

19. A non-transitory computer storage medium, wherein the computer storage medium stores computer-executable instructions, which are configured to cause a computer to perform the method of claim 1.

* * * * *